United States Patent Office 3,309,347
Patented Mar. 14, 1967

3,309,347
POLYMERIZATION PROCESS USING CATALYST CONTAINING SUBSTITUTED ETHERS
Harry W. Coover, Jr., and Marvin A. McCall, Kingsport, Tenn., assignors to Eastman Kodak Company, Rochester, N.Y., a corporation of New Jersey
No Drawing. Filed Oct. 10, 1963, Ser. No. 315,380
14 Claims. (Cl. 260—93.7)

This invention relates to a new and improved process for the polymerization of olefinic hydrocarbons. More particularly, this invention relates to a novel catalyst combination for preparing high molecular weight, solid polyolefins, such as polypropylene of high density and crystallinity. In a specific aspect, this invention relates to the preparation of polymers of propylene and its higher homologs using a particular catalyst combination which has unexpected catalytic activity and which results in polymeric products characterized by high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations and the results are ordinarily highly unpredictable since relatively minor changes in the catalyst combination often lead to liquid polymers rather than the desired solid polymers. In addition, the same catalysts which form solid polymers from ethylene will often form only liquid polymers from other α-monoolefins such as propylene.

Among the catalysts that have been employed to polymerize olefinic hydrocarbons to solid crystalline polymers are combinations that include organo-aluminum compounds, such as trialkyl aluminum compounds in conjunction with certain inorganic halides. Thus, triethyl aluminum in conjunction with titanium tri- or tetrachloride catalyzes a polymerization reaction for the production of crystalline polymers from olefinic hydrocarbons. However, such prior art two component catalyst systems give large amounts of rubber, oils, and low molecular weight non-crystalline materials. These materials are usually removed from the crystalline polymers by extraction in order to obtain a product having good physical properties in the form of fiber, sheeting, molded articles and the like. Such extraction is both troublesome and expensive. It would be desirable, therefore, to provide a catalytic polymerization process for olefinic hydrocarbons which will give a highly crystalline polymer acceptable for most commercial applications without extraction.

Accordingly, it is an object of this invention to provide an improved process for the polymerization of olefinic hydrocarbons to form solid, high density, crystalline products.

It is another object of this invention to provide an improved process for the polymerization of propylene and higher α-monoolefinic hydrocarbons to produce solid, high density, crystalline products.

It is another object of this invention to provide novel catalyst combinations which have unexpected catalytic activity for the polymerization of olefinic hydrocarbons to form crystalline high density polymers.

Other objects of this invention will be readily apparent from the detailed disclosure.

The above and other objects are accomplished by means of this invention wherein olefinic hydrocarbons containing at least 3 carbon atoms, either singly or in admixture, are readily polymerized to high molecular weight, solid crystalline polymers by effecting the polymerization in the presence of a catalyst composition comprising (1) a compound of a transition metal from Group IVB–VIB of the Periodic Table and (2) a compound having the formula:

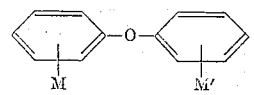

where M is an alkali metal, $AlR_2$ or $Li \cdot AlR_3$, where each R is an alkyl radical, desirably containing up to 10 carbon atoms and M' is hydrogen, an alkali metal, $AlR_2$ or $Li \cdot AlR_3$ where R is as defined. Although the R radicals desirably contain up to 10 carbon atoms, those containing 1–8 carbon atoms are preferred. Suitable R radicals include, therefore, methyl, ethyl, propyl, butyl, octyl, decyl and the like.

The transition metal compounds of the above catalyst system are those generally employed in the polymerization of olefinic hydrocarbons and comprise the alkoxides, alkoxyhalides, and halides including oxyhalides, such as iodides, chlorides, or bromides of Group IVB–VIB metals such as titanium, vanadium, zirconium, chromium and molybdenum. Transition metal compounds in which the metals are at their maximum valence can be used, or if desired, a reduced valency form of the compound can be employed. It is preferred to use the titanium chlorides which may be in the form of titanium tetrachloride, titanium trichloride and titanium dichloride. Examples of other metal halides, alkoxides and alkoxyhalides, preferably containing lower alkoxy groups, that can be employed are titanium tetrabromide, titanium tribromide, zirconium tetrachloride, zirconium tribromide, vanadium trichloride, molybdenum pentachloride, chromium tribromide, titanium tetrabutoxide, vanadium oxychloride, vanadium triethoxide, titanium tetraoctoxide, titanium oxychloride, dichlorotitanium dibutoxide and the like. The Periodic Table referred to herein can be found in "Lange's Handbook of Chemistry," 8th edition (1952), at pages 56 and 57.

The catalytic mixtures employed in the practice of this invention contain one component having the formula:

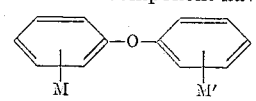

where M and M' are as defined hereinbefore. Suitable alkali metals include sodium, potassium, lithium, and the like. Included within the scope of the invention, therefore, are such compounds as oxydi-o-phenylenedilithium, o-phenoxyphenyllithium, m-phenoxyphenyllithium, p-phenoxyphenyllithium, oxydi-o-phenylenebis(diethylaluminum), oxydi-o-phenylenelithium-aluminumtriethyl complex, oxydi-o-phenylenedisodium and the like. The mono and disubstituted lithium compounds and their preparation have been described in scientific literature such a Oita et al., J. Am. Chem. Soc., 79, 339 (1957). and Langham et al., J. Am. Chem. Soc., 63, 545 (1941). Such compounds can be prepared by reacting the corresponding o, m or p-halophenyl ether with alkyl or aryl lithium compounds. The other alkali metal alkyls or aryls will give the corresponding substituted ether when they are substituted for the lithium alkyl or aryl compounds. Suitable halophenyl ethers are those containing chlorine, iodine, bromine or the like while suitable alkyl or aryl alkali metal compounds include lithium butyl, sodium butyl, potassium ethyl, lithium phenyl, sodium phenyl or the like. The reaction is generally carried out in a solvent or mixture of solvents such as ethyl ether, benzene, xylene, hexane, heptane or the like, at temperatures usually not in excess of about 70° C. The reaction is generally completed in not more than 70 hours. The alkali metal substituted ether obtained by the aforementioned procedure can then be reacted, desirably in equimolar amounts, with an aluminum alkyl compound having the formula $AlR_3$ or $AlR_2X$ where each R is an alkyl radical such as methyl, ethyl, propyl, hexyl, octyl, decyl or the like and X is a halogen such as chlorine, bromine or iodine to obtain the corresponding aluminum alkyl containing compound or complex. This latter reaction is carried out in a solvent or mixture of solvents at temperatures which are generally no more than about 75° C.

It is surprising that the two component catalysts of this invention are effective to form solid, highly crystalline polymers. Thus, most prior art two component catalysts, as well as three component catalysts such as lithium metal, diphenyl ether and titanium trichloride, generally give polymer containing about 20–25%, by weight, of an extractable amorphous fraction, as shown by the following examples.

The inventive process is generally carried out in liquid phase in an organic liquid, preferably in a liquid hydrocarbon vehicle, but the process can be carried out in the absence of such vehicle. The process proceeds with excellent results over a temperature range of from 50° C. to 150° C., although it is preferred to operate within the range of from about 50° C. to about 90° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ extremely high pressures which have often been necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing other olefinic hydrocarbons, preferably aliphatic $\alpha$-monoolefinic hydrocarbons, containing at least 3 carbon atoms and generally no more than about 12 carbon atoms. Other suitable olefinic hydrocarbons, branched or unbranched, include pentene, hexene, heptene, decene, 3-methyl-1-butene, 4-methyl-1-pentene, 3,5-dimethyl-1-hexene, allyl benzene, allylcyclopentane and the like.

The process of the invention readily results in solid polymers having molecular weights greater than 1000 and usually greater than 10,000. Furthermore, polymers having molecular weights of as much as 1,000,000 or higher can be readily prepared if desired. These polymers will exhibit crystallinities in excess of 85%, generally in excess of 90%, as shown by extraction with a suitable solvent such as hexane, heptane, diethyl ether or the like, which will remove the non-crystalline amorphous fractions.

The novel catalysts described above are quite useful for polymerizing propylene to form a crystalline, high density polymer. The polypropylene produced generally has a softening point above 155° C. and a density of 0.90 and higher. Usually the density of the polypropylene is of the order of 0.91 to 0.92.

The polymers prepared in accordance with this invention can be molded or extruded and can be used to form plates, sheets, films or a variety of molded objects which exhibit a higher degree of stiffness than do the corresponding polymers prepared using high pressure processes. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The limiting factor in the temperature of the process appears to be the decomposition temperature of the catalyst. Ordinarily, temperatures 50° C. to 90° C. are employed, although temperatures as high as 150° C. or as low as 0° C. can be employed if desired. Usually, it is not desirable or economical to effect the polymerization at temperatures below 50° C. and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight fractions which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2%, by weight, based on the weight of the vehicle. The concentration of the monomer in the vehicle will vary rather widely depending upon the reaction conditions and will usually range from about 2 to about 50%, by weight. For a solution type of process it is preferred to use a concentration from about 2 to about 10% by weight based on the weight of the vehicle, and for a slurry type of process higher concentrations, for example, up to 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of component (2) to transition metal compound in our catalyst is generally within the range of about 0.1:1 to about 12:1, preferably in the range of about 0.5:1 to about 6:1, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle, when employed, can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, or any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When highly uniform polymers are desired employing the continuous process wherein the process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

Example 1

A reaction mixture consisting of 17.0 g. (0.1 mole) of diphenyl ether in 100 cc. of dry ethyl ether, and 0.25 mole of n-butyl lithium (15% conc.) in a mixture of hexane and heptane is stirred at 35–40° C. under nitrogen for 60 hr. The ethyl ether is then exchanged with dry benzene by adding 100 cc. of benzene and distilling off the ethyl ether and hexane plus a small amount of benzene to insure complete removal of the ethyl ether. The final volume is 90 cc. which contains approximately 0.09 mole of oxydi-o-phenylenedilithium. The structure of oxydi-o-phenylenedilithium ether is readily demonstrated by carbonation to 2,2'-oxydibenzoic acid, M.P. 220–225° C.

Example 2

Diphenyl ether (60 ml.) is placed in a 250 ml. round bottom flask equipped with a thermometer, dropping funnel, water cooled condenser and drying tube. Lithium butyl (0.1 mole in pentane and heptane) is then added to the diphenyl ether with stirring at 50° C. until all the lithium butyl reacts as shown by a negative Gilman Color Test II [Gilman et al., J. Am. Chem. Soc., 62, 1847 (1940)]. A small quantity of the product is carbonated producing o-phenyl benzoic acid which confirms the structure of o-phenoxyphenyllithium.

Repeating the above procedure by reacting 4-bromophenyl phenyl ether with butyllithium in dry benzene gives p-phenoxyphenyllithium. Similarly, when 3-bromophenyl phenyl ether is reacted with butyl lithium in dry benzene, the m-phenoxy phenyl lithium is obtained.

Example 3

Oxydi-o-phenylenebis(diethylaluminum) is prepared by the following procedure. Oxydi-o-phenylenedilithium (0.05 mole) is first prepared as described in Example 1 and then reacted with 12.05 g. (0.1 mole) of diethylaluminum chloride in dry hexane solution at a temperature below 75° C. A light tan precipitate forms and the reaction mixture is stirred for about 15 hours and filtered in a dry box. 4.2 g. of lithium chloride is obtained and discarded. The liquid gives a positive Gilman I and a negative Gilman II Color Test [Gilman et al., J. Am. Chem. Soc., 47, 2002 (1925), and Gilman et al., J. Am. Chem. Soc., 62, 1847 (1940)]. The total volume of the liquid at this point is 58 ml. which contains approximately 0.05 mole of oxydi-o-phenylenebis(diethylaluminum).

Homologs of this compound can be obtained when homologs of diethylaluminum monohalide are used. For example, oxydi-o-phenylenebis(didecylaluminum) is obtained when didecylaluminum chloride is reacted with oxydi-o-phenylenedilithium.

Example 4

Oxydi-o-phenylenedilithium-triethylaluminum complex is prepared by the following steps. Oxydi-o-phenylenedilithium (0.05 mole) is prepared as described in Example 1 and then reacted with 11.4 g. (0.1 mole) of triethyl aluminum in dry heptane. A very thick precipitate forms upon the addition of triethyl aluminum. The mixture is stirred for about 15 hours under nitrogen and filtered in a dry box. The filtrate gives negative Gilman II and I Color Tests. The solid is a cream colored, flaky material which gives positive Gilman Color Tests I and II.

Homologs of the above compound are obtanied when homologs of triethylaluminum are used. For example, when triisobutylaluminum is used, the product is oxydi-o-phenylenedilithium-triisobutylaluminum complex; when trimethylaluminum is used, the product is oxydi-o-phenylenedilithium-trimethylaluminum complex.

Example 5

Oxydi-o-phenylenedisodium is obtained by reacting diphenyl ether (0.05 mole) with 0.1 mole of sodium butyl according to the procedure of Example 1. This material gives positive Gilman Color Tests I and II.

Example 6

As already indicated, the prior art two component catalysts, as well as three component catalysts containing alkali metals, diaryl ethers and transition element compounds, generally give polymers containing 20–25% extractables. To illustrate, a 310 cc. stainless steel autoclave is charged with 100 cc. of dry mineral spirits, 0.46 g. of triethylaluminum (0.004 mole) and 0.62 g. (0.004 mole) of titanium trichloride. The charging operation is carried out in a dry box. The autoclave is next charged with 100 cc. (51 g.) of liquid propylene. The autoclave is then heated to 55° C. and the reaction becomes exothermic. The reaction temperature is then held at 85° C. for 1 hr. All of the propylene is converted to polymer. The polypropylene obtained by this process is extracted using a Soxhlet extractor at 110° C .for 8 hr. with n-butyl ether which removes the non-crystalline polypropylene. The ether is evaporated and the extracted polymer washed with ethanol, then with water and dried in an oven at 50° C. The dried extract is weighed and the percent extractables determined to be 20%.

Similarly, when the above procedure is repeated using a catalyst mixture of lithium metal, diphenyl ether and titanium trichloride (mole ratio 1:1:1) the polymer contains in excess of 20% extractables.

*Example 7*

When 0.004 mole of oxydi-o-phenylenedilithium is used in place of triethylaluminum with 0.62 g. (0.004 mole) of titanium trichloride by the same procedure described in Example 6, the conversion is 100%, the percent extractables is only 4.6% and the polymer has an inherent viscosity in tetralin at 145° C. of 3.9.

When o-phenoxyphenyllithium, m-phenoxyphenyllithium or p-phenoxyphenyllithium is used as a catalyst with titanium trichloride, the percent extractables in the polymer does not exceed 6.5%.

*Example 8*

The procedure of Example 6 is repeated with 0.004 mole of oxydi-o-phenylenedisodium, 0.62 g. (0.004 mole) of titanium trichloride, in 100 cc. of dry mineral spirits and 100 cc. of liquid propylene. The conversion is 100%, the percent extractables is 6% and the polymer has an inherent viscosity in tetralin at 145° C. of 2.9.

When titanium trichloride in the above catalyst is replaced by zirconium tetrachloride, chromic chloride, molybdenum pentoxide, vanadium oxychloride, titanium oxychloride, titanium tetrabutoxide, or dimethoxy titanium dichloride, good yields of highly crystalline polypropylene are obtained. Similarly, highly crystalline polymers are also obtained by using butene-1, pentene-1, 4-methyl-1-pentene, styrene, allyl benzene and vinyl cyclohexane as monomers in place of propylene in any of the above procedures.

*Example 9*

The procedure of Example 6 is repeated with 0.004 mole of oxydi-o-phenylenebis(diethylaluminum), 0.62 g. (0.004 mole) of titanium trichloride in 100 cc. of dry heptane and 100 cc. of liquid propylene. The conversion is 100%, the percent extractables is 4.9% and the polymer has an inherent viscosity in tetralin at 145° C. of 2.8. When oxydi-o-phenylenebis(didecylaluminum) is used, the conversion is 100% and the extractables 6.5%.

*Example 10*

The procedure of Example 6 is repeated with 0.004 mole of oxydi-o-phenylenedilithium-triethylaluminum complex, 0.62 g. (0.004 mole) of titanium trichloride in 100 cc. of dry heptane and 100 cc. of liquid propylene. The conversion is 100% and the percent extractables is 5.6%. When oxydi-o-phenylenedilithium - triisobutylaluminum complex is used with titanium trichloride, the conversion is 100% and the extractables are 6.4%.

*Example 11*

A catalyst mixture of oxydi-o-phenylenebis(diethylaluminum) and titanium trichloride is used in the same procedure of Example 6 with 200 cc. of 4-methyl-1-pentene and no added solvent. The conversion is 100% and the product is a crystalline polymer having a melting point of 205° C. and an inherent viscosity in tetralin at 145° C. of 1.15. The extractables are less than 6%, by weight.

*Example 12*

The novel catalysts of this invention are effective for the copolymerization of α-olefinic hydrocarbons. To illustrate, the catalyst mixture of Example 11 is used in the procedure of Example 6 with a monomer mixture containing an 80/20 mole ratio of propylene/butene. The copolymer obtained gives a tough clear film, has an inherent viscosity in tetralin at 145° C. of 2.6 and contains 6.5%, by weight, extractables.

Similar high catalytic activity is observed when the catalyst systems of Examples 7, 8, and 10 are used with a monomer mixture containing 50/50 mole ratio of styrene and allyl benzene.

*Example 13*

The procedure of Example 6 is repeated with a catalyst comprising oxydi-o-phenylenedilithium (0.004 mole) and titanium trichloride (0.004 mole) using butadiene as the monomer. The yield is 78% of a polymer shown to be cis-1,4-polybutadiene by infrared.

Thus, by means of this invention α-olefinic hydrocarbons, particulary α-monoolefins such as propylene, are readily polymerized using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments and the like, or mixed with other polymeric materials, waxes and the like. In general, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst, it is possible to produce polymeric hydrocarbons, particularly polypropylene, having improved properties. For example, polypropylene prepared in the presence of catalyst combinations within the scope of this invention is substantially free of rubbery and oily polymers and thus it is not necessary to subject such polypropylene to extraction procedures in order to obtain a commercial product. Such polypropylene also has a very high stiffness as a result of the unexpectedly high crystallinity.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefinic monomer. The polymeres produced in accordance with this invention can be separated from polymerization catalyst by conventional procedures such as by washing with water or lower aliphatic alcohols such as methanol.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. In the polymerization of olefinic hydrocarbon containing at least 3 carbon atoms to form solid, crystalline polymer, the improvement which comprises catalyzing the polymerization with a catalyst mixture consisting essentially of (1) a compound of a transition metal from Group IVB–VIB of the Periodic Table and (2) a compound having the formula:

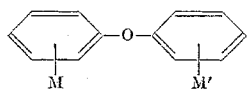

where M is a member selected from the group consisting of alkali metals, $AlR_2$ and $Li \cdot AlR_3$ where each R is an alkyl radical and M' is a member selected from the group consisting of hydrogen, alkali metal, $AlR_2$ and $Li \cdot AlR_3$ where each R is an alkyl radical.

2. The method according to claim 1 where (1) is a titanium halide.

3. The method according to claim 1 wherein the olefinic hydrocarbon containing at least 3 carbon atoms is propylene and (1) is titanium trichloride.

4. In the polymerization of propylene to form solid, crystalline polymer, the improvement which comprises catalyzing the polymerization with a catalyst mixture consisting essentially of (1) titanium trichloride and (2) oxydi-o-phenylenedilithium.

5. In the polymerization of propylene to form solid, crystalline polymer, the improvement which comprises catalyzing the polymerization with a catalyst mixture consisting essentially of (1) titanium trichloride and (2) o-phenoxyphenyllithium.

6. In the polymerization of propylene to form solid, crystalline polymer, the improvement which comprises catalyzing the polymerization with a catalyst mixture consisting essentially of (1) titanium trichloride and (2) oxydi-o-phenylenebis(diethylaluminum).

7. In the polymerization of propylene to form solid, crystalline polymer, the improvement which comprises catalyzing the polymerization with a catalyst mixture consisting essentially of (1) titanium trichloride and (2) oxydi-o-phenylenedilithiumaluminumtriethyl complex.

8. As a composition of matter, a polymerization catalyst consisting essentially of (1) a compound of a transition metal from Group IVB–VIB of the Periodic Table and (2) a compound having the formula:

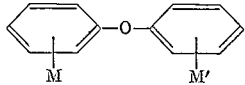

where M is a member selected from the group consisting of alkali metals, $AlR_2$ and $Li \cdot AlR_3$ where each R is an alkyl radical and M' is a member selected from the group consisting of hydrogen, alkali metal, $AlR_2$ and $Li \cdot AlR_3$ where each R is an alkyl radical.

9. As a composition of matter, the polymerization catalyst of claim 8 in which (1) is titanium halide.

10. As a composition of matter, the polymerization catalyst of claim 8 in which (1) is titanium trichloride.

11. As a composition of matter, a polymerization catalyst consisting essentially of (1) titanium trichloride and (2) oxydi-o-phenylenedilithium.

12. As a composition of matter, a polymerization catalyst consisting essentially of (1) titanium trichloride and (2) o-phenoxyphenyllithium.

13. As a composition of matter, a polymerization catalyst consisting essentially of (1) titanium trichloride and (2) oxydi-o-phenylenebis(diethylaluminum).

14. As a composition of matter, a polymerization catalyst consisting essentially of (1) titanium trichloride and (2) oxydi-o-phenylenedilithium-aluminumtriethyl complex.

References Cited by the Examiner

FOREIGN PATENTS 829,440   3/1960   Great Britain.

JOSEPH L. SCHOFER, *Primary Examiner.*

M. B. KURTZMAN, *Assistant Examiner.*